(12) United States Patent
Elissen

(10) Patent No.: US 8,621,985 B2
(45) Date of Patent: Jan. 7, 2014

(54) DEVICE FOR FROTHING MILK OR OTHER MILK BASED LIQUIDS

(75) Inventor: Peter Adrianus Johannes Maria Elissen, Eemnes (NL)

(73) Assignee: Foremost B.V. (NL)

( * ) Notice: Subject to any disclaimer, the term of this patent is extended or adjusted under 35 U.S.C. 154(b) by 246 days.

(21) Appl. No.: 13/318,816

(22) PCT Filed: May 6, 2010

(86) PCT No.: PCT/NL2010/050265
§ 371 (c)(1),
(2), (4) Date: Nov. 4, 2011

(87) PCT Pub. No.: WO2010/128857
PCT Pub. Date: Nov. 11, 2010

(65) Prior Publication Data
US 2012/0055348 A1     Mar. 8, 2012

(30) Foreign Application Priority Data
May 6, 2009    (NL) ...................................... 1036928

(51) Int. Cl.
*A47J 31/00*    (2006.01)
*A47J 31/44*    (2006.01)

(52) U.S. Cl.
USPC ............ 99/323.1; 99/348; 366/273; 366/249; 261/DIG. 16

(58) Field of Classification Search
USPC ......... 99/323.1, 348; 366/273, 274, 144, 146, 366/242, 244, 249; 261/DIG. 16
See application file for complete search history.

(56) References Cited

U.S. PATENT DOCUMENTS

| | | | | |
|---|---|---|---|---|
| 2,743,910 | A | * | 5/1956 | Melville ........................ 366/273 |
| 4,534,656 | A | * | 8/1985 | de Bruyne .................... 366/247 |
| 6,219,267 | B1 | | 4/2001 | Andres |
| 6,318,247 | B1 | | 11/2001 | Di Nunzio et al. |

(Continued)

FOREIGN PATENT DOCUMENTS

| | | |
|---|---|---|
| CN | 1440106 | 9/2003 |
| CN | 2730144 | 10/2005 |

(Continued)

OTHER PUBLICATIONS

International Search Report for PCT/NL2010/050265, Completed by the European Patent Office on Jun. 17, 2010, 3 Pages.

(Continued)

*Primary Examiner* — Reginald L Alexander
(74) *Attorney, Agent, or Firm* — Brooks Kushman P.C.

(57) ABSTRACT

A device for frothing milk with a base element including a container for receiving milk to be frothed and a removable lid including a motor for driving a circular annular spring for frothing milk, the latter being driven by a motor in the lid. To this end, electrical energy needs to be transferred to the motor. This is done using inductive coupling. This removes the need for providing bare electrical contacts thus removing disadvantages like risk of short circuit and electrical shock hazards. To achieve this, both the base element and the lid are fitted with windings for transferring electrical energy. To improve the effectiveness of inductive coupling, frequency conversion means are provided to supplying an alternating current at a relatively high frequency to the first winding. The first winding is used as an inductive element for an oscillator as well.

15 Claims, 5 Drawing Sheets

(56) References Cited

U.S. PATENT DOCUMENTS

| | | | |
|---|---|---|---|
| 7,669,517 B2 | 3/2010 | Boussemart et al. | |
| 2001/0043508 A1* | 11/2001 | Zhou | 366/273 |
| 2005/0173572 A1 | 8/2005 | Kim | |
| 2007/0053238 A1* | 3/2007 | Kocienski | 366/273 |
| 2008/0008806 A1 | 1/2008 | Boussemart et al. | |

FOREIGN PATENT DOCUMENTS

| | | |
|---|---|---|
| CN | 101056570 | 10/2007 |
| CN | 201404083 Y | 2/2010 |
| DE | 102004043579 A1 | 5/2006 |
| DE | 202006000446 U1 | 5/2006 |
| EP | 1816659 A1 | 8/2007 |
| EP | 1987750 A2 | 11/2008 |
| IL | 120490 | 12/1999 |
| WO | 2007025789 A1 | 3/2007 |
| WO | 2009020384 A1 | 2/2009 |

OTHER PUBLICATIONS

Search Report for NL 1036928, Completed on Apr. 8, 2010, 3 Pages.

* cited by examiner

DEVICE FOR FROTHING MILK OR OTHER MILK BASED LIQUIDS

CROSS-REFERENCE TO RELATED APPLICATION

This application is the U.S. national phase of PCT Appln. No. PCT/NL2010/050265 filed May 6, 2010 which claims priority to the Netherlands application 1036928 filed May 6, 2009, the disclosures of which are incorporated in their entirety by reference herein.

FIELD OF THE INVENTION

The present invention relates to a device for frothing milk or other milk-based liquids and the use thereof.

BACKGROUND OF THE INVENTION

Agitation of milk in the form of frothing the milk is used e.g. for preparing beverages like cappuccinos, milky coffees, café lattes, macchiato, etc. that typically comprises a liquid portion like coffee topped with a layer of frothed milk.

Various devices for frothing milk is known in various types and shapes including simpler domestic ones primarily using physical agitation to froth the milk and typically more professional or advanced ones e.g. using steam from a steam pipe to agitate and thereby froth the milk.

It is generally known that heating or pre-heating the milk will typically enhance the frothing process.

As mentioned, domestic milk frothers typically have one or more agitation elements to be immersed in the milk and driven by hand, electromechanically, or magnetically and thereby froth the milk. An aim may be to ensure frothing as fast as possible and/or e.g. also as uniformly as possible.

Other types of mixers for food liquids or liquid-like foods are also generally known.

Patent specification WO 2009/020384 discloses a device for frothing milk. Milk is contained in a container comprised by a main body and heated by means of a heating element. While heating the milk, the milk is agitated by means of a circular annular spring. This results in frothed milk for serving for example a cappuccino or other drinks. The spring is driven by a motor in a lid for closing the container. Contact between the main body and the lid for powering the motor is provided by means of open electrical contacts.

Patent specification WO 2007/025789 discloses a refrigerator comprising two inductors for contactlessly transferring electrical energy to activate a fan electrical energy to a fan thereby creating air circulation in a drawer. The two inductors disclosed are bulky, making them unsuitable for use in handheld devices.

Patent specification U.S. Pat. No. 6,219,267 discloses a contactless connecting system between a base and a terminal providing the possibility of supplying any standard electrical appliance once it is connected to the terminal. The terminal disclosed is a bulky device and intended for supplying high power.

Electrical toothbrushes generally available in the market use inductive coupling for charging batteries to power the toothbrush. The inductive coupling transfers electrical energy at a relatively low power level, only suitable for charging the batteries. Hence, users of the toothbrush are highly recommended to power off the toothbrush before charging the batteries, by means of the product documentation.

OBJECT AND SUMMARY OF THE INVENTION

It is an object of the invention to provide a device for frothing milk or milk-based liquids that at least to an extent alleviates one or more drawbacks described above.

Another object is to provide a device for frothing milk that is easier and/or safer to use than currently available.

The invention provides in a first aspect of the invention a device for frothing milk or other milk based liquids comprising a main body, which main body forms a container for the milk or other milk based liquids, a cover fitting onto a top of the main body; and a driving element operatively coupled to an agitation element, the driving element being at least partially comprised by the cover, wherein the device further comprises an inductive coupling comprising at least one primary winding comprised by the main body and at least one secondary winding comprised by the cover, wherein power for operating the driving element is transferred from the main body to the driving element via said inductive coupling during operation of the driving element.

An advantage of such a device for frothing milk is that there are no bare contacts on the main body and the cover. This decreases or even removes the risk of short circuit between contacts. In addition, different and in particular higher voltages can be used for transferring energy/power from the main body to the driving element. This increases design freedom to provide efficient transfer of energy. Furthermore, by having no bare contacts means that the device for frothing milk may easier be cleaned. This may e.g. be because such bare contacts, e.g. as used in prior art, are usually spring loaded, which means they are flexible and can bend inwardly, resulting in an opening into the main body in which water can enter.

In one embodiment, the primary winding and the secondary winding are substantially parallel to a top plane of the main body.

In one embodiment, the primary winding and secondary winding are substantially parallel to a circumference of the top of the main body and substantially perpendicular to a top plane of the main body.

In one embodiment, the cover and the top of the main body have a similarly shaped circumference and the primary winding follows the circumference of the top of the main body and the secondary winding follows the circumference of the cover.

An advantage of this embodiment is that the actual orientation of the cover on the top of the main body is not relevant for the effectiveness of the inductive coupling. The reason for this is that effective inductive coupling requires proper alignment of the primary and secondary winding. In this embodiment, both windings are properly aligned when the cover is on the main body, irrespective of the orientation of for example a circular cover with respect to the main body.

In one embodiment, the cover comprises at least two secondary windings and the primary winding is sandwiched between the two secondary windings during operation of the driving element. An advantage of this embodiment is that the inductive coupling between the primary winding and the secondary windings is improved.

In one embodiment, the main body comprises at least two primary windings and wherein the secondary winding is sandwiched between the two primary windings when operating the driving element. An advantage of this embodiment is that the inductive coupling between the primary winding and the secondary windings is improved.

In one embodiment, one winding is located in a stub and the other winding is located around a hole or a slit in which the stub closely fits.

In one embodiment, the cover can be locked onto the main body by means of a bayonet closing and the windings are located in the bayonet closing. An advantage of this embodiment is that the container is securely closed during operation of the milk frothing apparatus.

In one embodiment, at least one ferrite core is located in the primary winding and/or the secondary winding.

In one embodiment, the main body comprises an oscillator for generating a first alternating current at a first frequency, the oscillator being coupled to the primary winding for supplying said alternating current to the primary winding. An advantage of this embodiment is that the frequency of the alternating current provided to the first winding can be controlled by means of design independently from a frequency of an external power source. This is particularly advantageous as the efficiency of inductive coupling is partially determined by the frequency of the alternating current; inductive coupling works more efficiently at a higher frequency of the current in the primary winding.

In one embodiment, the main body is connected to an external power source providing a second alternating current at a second frequency, the first frequency being higher than the second frequency.

In one embodiment, the oscillator is a Collpits oscillator. An advantage of a Collpits oscillator is that only one inductance is used, where an inductance is usually a relatively expensive component. In addition, Collpits oscillators have at least three degrees of freedom for determining the oscillating frequency, being the values of two capacitances and one inductance.

In one embodiment, the primary winding is used as an inductor in the Collpits oscillator. An advantage of this embodiment is that only one winding/inductance is required on the primary side of the inductive coupling, whereas still at least two degrees of freedom are left, being the values of two capacitances. The requirement of only one winding/inductance at the primary side results in a cost reduction.

In one embodiment, the primary winding oscillator is increased to provide higher speed for optima frothing performance.

The invention provides in a second aspect use of a device for frothing milk according to claim 1, wherein said device is used for frothing milk.

BRIEF DESCRIPTION OF THE DRAWINGS

These and other aspects of the invention will be apparent from and elucidated with reference to the illustrative embodiments shown in the drawings, in which.

DESCRIPTION OF PREFERRED EMBODIMENTS

Figure 1:
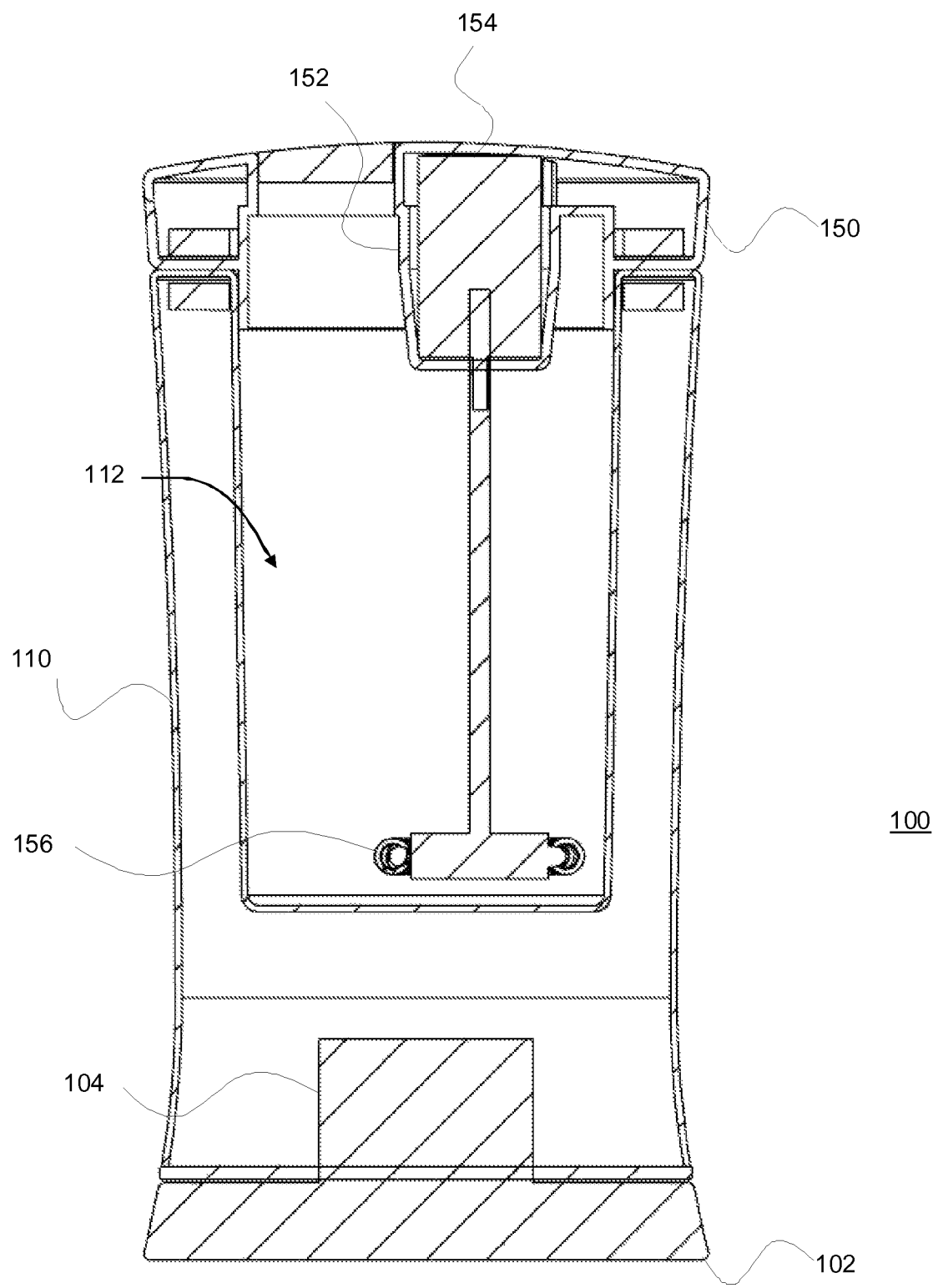
FIG. 1 depicts an embodiment of the milk frothing apparatus according to the invention.

FIG. 1 shows a milk frothing apparatus 100 as an embodiment of the device according to the invention. The milk frothing apparatus comprises a main body 110 comprising a container 112, a heating element in the bottom of the main body (not shown), a removable lid 150 serving as a cover, comprising a driving element housing 152 comprising a motor 154 serving as a driving element, an circular annular spiral spring 156 serving as an agitation element, further referred to as spring 156.

The milk frothing apparatus also comprises a base element 102. The base element is connected to a power cord (not shown) for supplying power to the milk frothing apparatus 100. The power is transferred to the main body via a contact stub 104 to a contact hole in the main body (not shown). In the contact stub, conductive elements are located for contacting further conductive elements in the contact hole. The power is used for powering the heating element and the motor 154. It will be apparent to a person skilled in the art that the power cord may also be directly coupled to the main body 110.

The base element 102 may e.g. have a general circumference that is of a size substantially the size of a general circumference of (the lower part of) the main body 110.

The heating element may be configured for being able to heat the container 112 to an average temperature of about 60° C. or so. This can bring milk being frothed (or any other liquid being frothed and/or mixed) to a temperature about 40° C. in about 45 seconds, which is usually an acceptable time frame for frothing milk (or other liquid) and also a period of time for when frothing of a good quality may be received. Other temperatures and/or other time periods may be aimed at as well. Subsequent or in parallel to the heating, the milk is agitated by the spring 156 to froth the milk. A person skilled in the art will appreciate that the milk frothing apparatus 100 may also be used with other milk based liquids or other liquids having similar characteristics enabling it to be frothed, for example due to structure and amount of proteins comprised by the liquid.

Figure 2A:
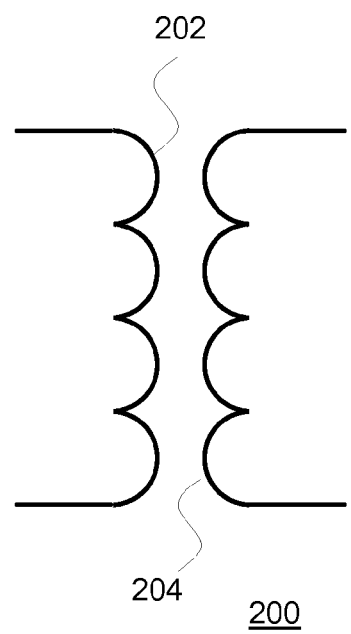
FIG. 2*a* provides a schematic view of an inductive coupling.

The power for driving the motor 154 for agitating the spring 156 is transferred from the main body to the motor 154 in the lid 150 by means of inductive coupling. FIG. 2*a* shows a schematic circuit diagram of a simple inductive coupling 200 comprising a primary winding 202 and a secondary winding 204. The primary winding 202 is connected to an AC (alternating current) current source. The alternating current in the primary winding 202 induces a magnetic field in the primary winding, resulting in a magnetic flux.

The magnetic flux is transferred from the primary winding 202 to the secondary winding 204. This results in an alternating current in the secondary winding 204. This alternating current can be used to supply power to further devices, like a motor, a heating element or other actuator, either directly or rectified.

The amount of electrical power transferred from the primary winding 202 to the secondary winding 204 depends on the amount of magnetic flux transferred from the primary winding to the secondary winding 204. The amount of the magnetic flux depends □ among others □ on the relatively permeability of the material in the centre of the winding.

Ferrite is a material to increase the flux density in inductive devices, though other materials are known to increase the flux density in such devices. A larger flux density improves the energy transfer in an inductive coupling. The core material may e.g. be provided in the winding only (I-shaped), or in and around the winding. In the latter case, the core material could e.g. be M-shaped or W-shaped □ with a core for each winding; the full core would result in a double M or W, either separable or not. With a core of such form the windings are around the middle leg of the core and the other legs serve to properly close the magnetic circuit as good as possible. The ferrite □ or other material □ core can be provided as a rod, a ring or another shape suitable to this set up.

Another factor for improved transfer of magnetic flux in inductive couplings is the distance between the primary winding 202 and the secondary winding 204. The best inductive coupling is achieved by winding the primary winding 202 and the secondary 204 winding together. It will be appreciated that this solution is not practical if the primary winding 202 is located in the main body 110 (FIG. 1) and the secondary winding is located in the lid 150 (FIG. 1) as the main body 110 and the lid 150 should be separable. However, good coupling can be achieved by placing the primary winding 202 in the secondary winding 204 or vice-versa. In particular in the first case, but to a large extent also in the second case, the whole magnetic flux induced by the primary winding 202 is comprised by the secondary winding 204. This can be achieved by placing one winding in a stub and the other around a hole in which the stub would fit.

Yet another factor for improved transfer of magnetic flux is the alignment of the primary winding 202 and the secondary winding 204. For best transfer of the magnetic flux, a general axis of the primary winding 202 should be aligned with a general axis of the secondary winding 204.

Figure 2B:
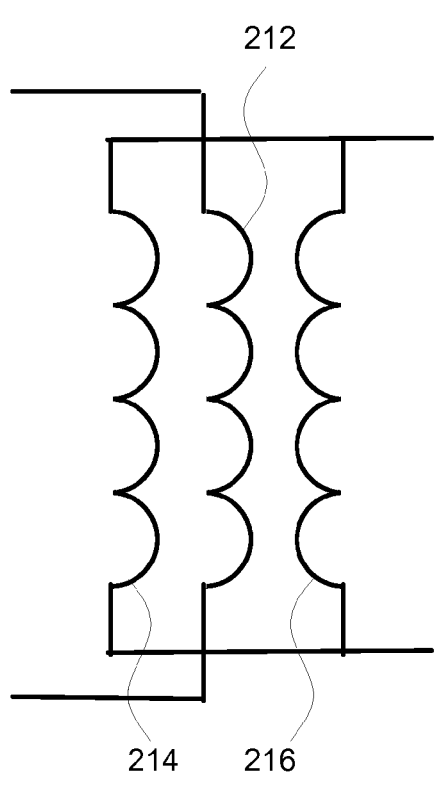
FIG. 2*b* provides a schematic view of another inductive coupling.

FIG. 2b shows a schematic circuit diagram of an inductive coupling 210 comprising a primary winding 212, a first secondary winding 214 and a second secondary winding 216. The primary winding 212 is sandwiched between the first secondary winding 214 and the second secondary winding 216. In this way, the secondary windings are able to catch more of the magnetic flux sent out by the primary winding 212.

For use with the milk frothing apparatus 100 (FIG. 1), this set up for transferring electrical energy to power the motor 154 by means of inductive coupling may be embodied in several ways, as will be apparent later on in the description. In particular, the main body 110 (FIG. 1) would comprise a stub or a plate comprising the primary winding 212 and the lid 150 (FIG. 1) would comprise a slit or opening in which the stub or plate would fit, with the first secondary winding 214 on one side of the slit or opening and the second secondary winding 216 on the other side of the slit or opening.

Figure 2C:
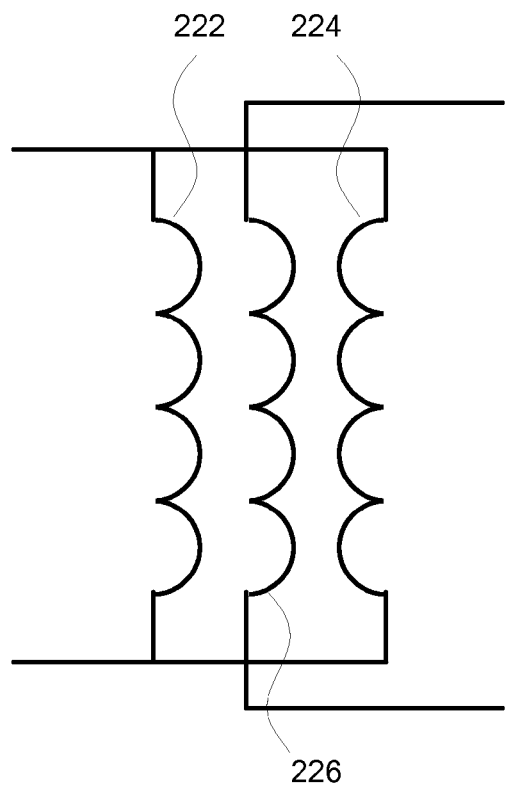
FIG. 2*c* provides a schematic view of a further inductive coupling.

FIG. 2c shows a schematic circuit diagram of an inductive coupling 220 comprising a first primary winding 222, a second primary winding 224 and a secondary winding 226. The secondary winding 226 is sandwiched between the first primary winding 222 and the second primary winding 224. In this way, magnetic flux is sent by the primary windings to the secondary winding 226 from two directions, improving efficiency of the transfer of energy. In practice, for use with the milk frothing apparatus 100 (FIG. 1), this set up for transferring electrical energy to power the motor 154 would be embodied in a similar way as with the embodiment depicted by FIG. 2b, though with the slit in the main body 110 (FIG. 1) and a stub or plate fitting the slit in the lid 150 (FIG. 1).

Figure 3:
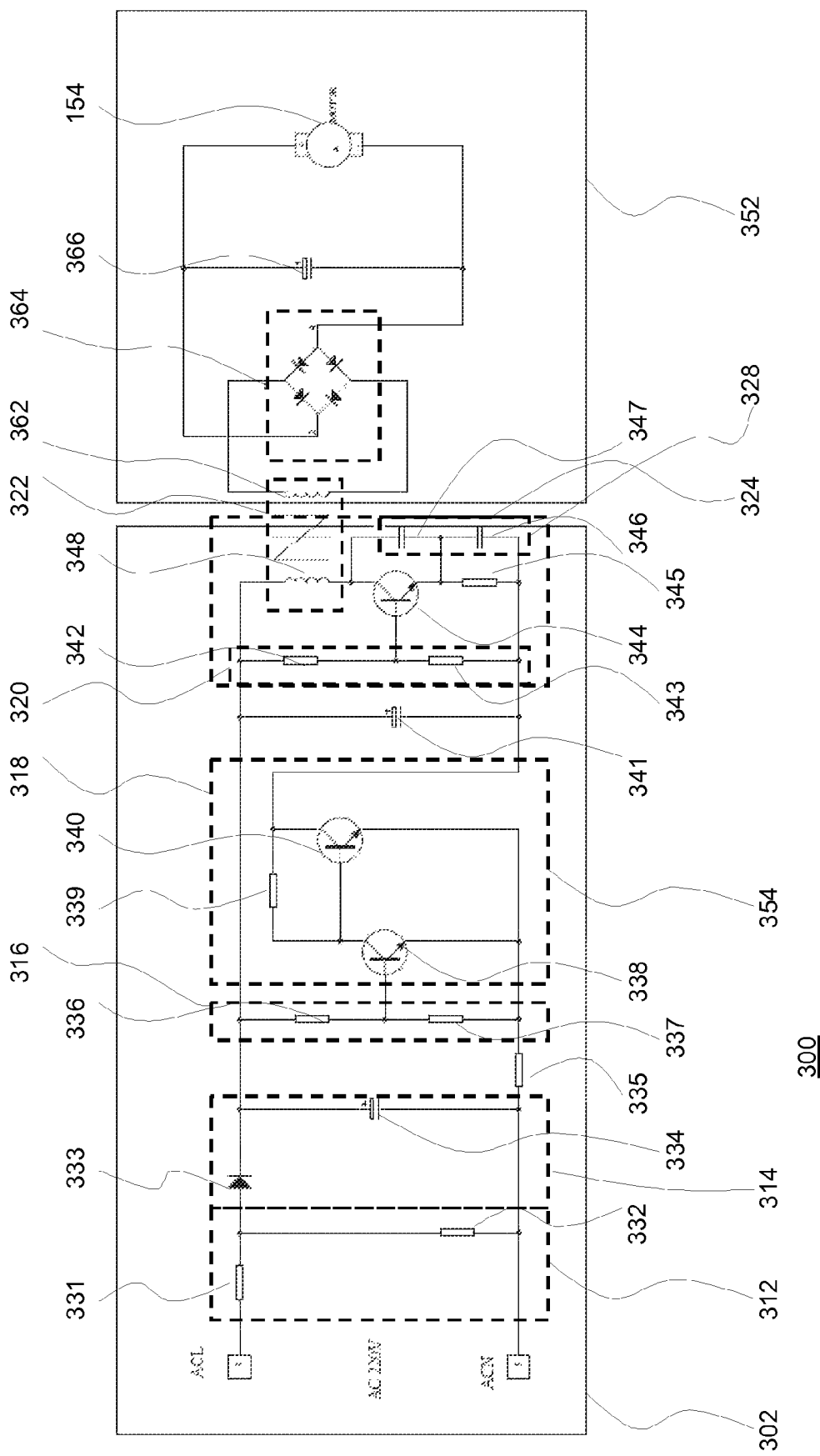
FIG. 3 depicts a schematic view of an electrical circuit for use in an embodiment of the milk frothing apparatus according to the invention.

FIG. 3 shows an electrical circuit 300 comprising a base circuit 302 and a lid circuit 352. The base circuit 302 is comprised by the main body 110 and the lid circuit is comprised by the lid 150, in a particular embodiment by the driving element housing 152. The terminals of the base circuit 302 are coupled to the power cord supplying electrical power to the milk frothing apparatus 100 (FIG. 1). In this embodiment, the electrical power is supplied at 220V and 50 Hz. However, other embodiments are envisageable as well, like 110V and 60 Hz that is used in a smaller set of countries or at other supply voltages or frequencies. For example, the frequency of the electrical power used in aircraft is 400 Hz.

The electrical power is supplied to a first voltage divider 312 comprising a first resistor 331 and a second resistor 332. By means of the first voltage divider 312, the voltage supplied to the rest of the circuit can be chosen upon design of the electrical circuit 300. The first voltage divider 312 is followed by a first rectifier 314, comprising a diode 333 and a first capacitor 334. The rectified voltage is, via a third resistor 335 supplied to a second voltage divider 316 comprising a fourth resistor 336 and a fifth resistor 337. The voltage over the fifth resistor 337 is supplied as a base-emitter voltage for a cascode circuit 354 comprising a first transistor 338, a sixth resistor 339 and a second transistor 340.

The voltage over the fourth transistor is divided over a second capacitor 341 and the upper part of the cascode circuit 354; one terminal of the second capacitor 341 being connected to the output terminal of the cascode circuit 354. Parallel to the second capacitor 341, the electrical circuit provides an oscillator 324.

The oscillator 324 is a Colpitts oscillator and comprises a third voltage divider 320 comprising a seventh resistor 342 and an eight resistor 343, a third transistor 344, a ninth resistor 345, a capacitive divider 328 comprising a third capacitor 347 and a fourth capacitor 346 and a first inductance 348. Though in the electrical circuit 300 a Colpitts oscillator is used, also other LC oscillators can be used. The advantage of using a Colpitts oscillator is that only one inductance is used and freedom of design is obtained by tweaking the values of the third capacitor 347 and the fourth capacitor 346. A person skilled in the art will appreciate that also other oscillators can be used, including, but not limited to a crystal oscillator or a fully electronic oscillator.

The frequency of the oscillator 324 can be tuned by means of the values of the third capacitor 347, the fourth capacitor 346 and the first inductance 348. As the first inductance 348 serves as a primary winding for transferring energy to the lid circuit, it is preferred that the value and other characteristics of the first inductance 348 are optimised for the purpose of transferring that energy.

Optimising the first inductance 348 for this and other purposes leaves the values of the third capacitor 347 and the fourth capacitor 346 for determining the frequency of the oscillator 324. For choosing the right oscillator frequency, it is important to realise that energy transfer by inductive coupling works better at higher frequencies. Therefore, it is advantageous to use the first rectifier 314 to rectify the 220 Volt 50 Hz power received and to subsequently generate an alternating current at a different frequency instead of supplying the 220 Volt 50 Hz directly to the first inductance 348. However, the latter option is specifically not excluded as an embodiment of the invention.

The first inductance 348 is inductively coupled to a second inductance 362 comprised by the lid circuit 352 and received electrical energy from the first inductance 348 by means of inductive coupling in a inductive coupling circuit 322. In that way, an alternating current generated by the oscillator 324 provided to the first inductance 348 results in another alternating current in the second inductance 362, resulting in an alternating voltage over the second inductance 362.

This voltage is supplies to a second rectifier 364 comprising four diodes in full bridge configuration. The output voltage over the second rectifier 364 is determined by various factors, including, but not limited to the ratio of windings in the first inductance 348 and the second inductance 362 and to the voltage over the first inductance 348.

Parallel to the second rectifier 364, the two terminals other than those to which the second inductance 362 is coupled, a fifth capacitor 366 is provided to smoothen an output voltage provided by the second rectifier 364.

Parallel to the fifth capacitor 366, the motor 154 (also FIG. 1) is provided, finally receiving the electrical energy/power (a person skilled in the art will appreciate that power is an instantaneous entity; integrating it over time results in the energy provided by the power source). Alternatively, an alternating current motor can be used, removing the need for the second rectifier 364.

The speed of the motor 154 depends on the amount of energy transferred by the circuit 300 and in particular on the characteristics of the inductive coupling circuit 322. The characteristics of the inductive coupling depend to a large extent on the ratio of windings of the first inductance 348 and winding of the second inductance 362. With a fixed number of windings on the first inductance 348 and a fixed primary voltage and current, the voltage at the secondary side can be increased in relation to the voltage at the primary side by increasing the number of windings on the second inductance 362. As a consequence, the current through the second inductance 362 will drop.

For properly frothing milk, relatively high speeds are required. Besides optimising the characteristics of the first inductance 348 and the second inductance 362 for efficient power transfer by the inductive coupling circuit 322, the characteristics are also optimised for achieving a motor speed best suited for frothing milk. Care should be taken to prevent a too low speed, resulting in no frothing, and to prevent a too high speed, destroying the structure of the frothed milk.

A person skilled in the art will appreciate that the first rectifier 314 is a half-bridge rectifier and that the second rectifier 364 is a full bridge rectifier. Both rectifiers can be embodied differently. The reason for embodying the first rectifier 314 as a half-bridge rectifier is that the cost of the components is lower. The reason for embodying the second rectifier 364 as a full bridge rectifier is that the largest amount of power received via the inductive coupling circuit 322 is transferred to the motor 154. If in the latter case a half-bridge rectifier would be used, only half the amount of energy would be transferred to the motor 154.

As indicated before, the base circuit 302 is to be integrated in the main body 110 and the lid circuit 352 are to be integrated in the lid 150. The primary winding(s) and secondary winding(s) can be integrated in the main body 110 and the lid 150 in several ways, of which various examples have been provided; further examples will be provided in the following part of the description. A person skilled in the art will appreciate that this number of examples is a non-exhaustive number of possibilities.

Figure 4:
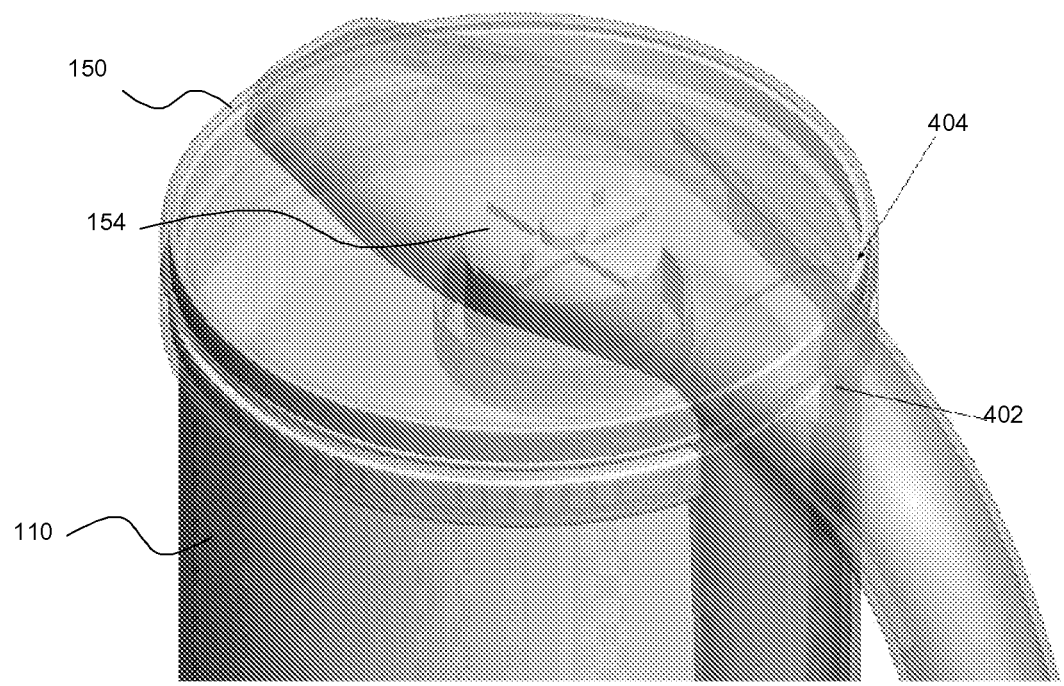
FIG. 4 shows a top view of another embodiment of the milk frothing apparatus according to the invention.

FIG. 4 shows a more detailed view of the top of the milk frothing apparatus 100. In particular, FIG. 4 shows the main body 110, the lid 150 and the motor 154. Furthermore, FIG. 4 shows a primary winding 402 and a secondary winding 404. The primary winding 402 follows the circumference of the top of the main body 110 and the secondary winding 404 follows the circumference of the lid 150. It is noted that different orientation and/or locations of the windings may be considered. What is important is their similar orientation and closeness.

The primary winding is coupled to the power cord. This can be done either directly, via a conventional inductive power transformer or by other elements, including, but not limited to any type of AC-AC power converters including frequency conversion means as disclosed above.

The primary winding is coupled to an AC power source. This results in an alternating magnetic field and hence an alternating magnetic flux in the primary winding 402. As the secondary winding 404 is located next to the primary winding 402, the magnetic flux generated by the primary winding 402 passes through the secondary winding, in turn creating an AC current in the secondary winding 404. The secondary winding 404 is coupled to the motor 154 to power the motor 154 for driving the spring 156 to froth milk in the container 112.

The embodiment of the device according to the invention shown by FIG. 4 is easy to use, as the actual orientation of the lid 150 on the top of the main body 110 is not relevant for the effectiveness of the inductive coupling. It is important, though, that the circumference of the top of the main body 110 is similarly shaped as the lid 150 □ or vice versa □ to ensure good inductive coupling. In addition, as discussed before, ferrite core elements may be used to improve inductive coupling between the primary winding 402 and the secondary winding 404.

A person skilled in the art will appreciate that ferrite elements are difficult to insert in the centre of the windings. However, small ferrite rods along the edge of the lid 150, container 112 or both already improve inductive coupling. Further improvement may be achieved by replacing individual rods by a ring, in either lid, container or both.

In another embodiment, C-shaped ferrite elements are placed around the primary winding 402 with the two legs □ of the C facing upward and C-shaped ferrite element are placed around the secondary winding 404 with the two legs of the C facing downward, facing the legs of the C-shaped elements around the primary winding 402.

Figure 5:
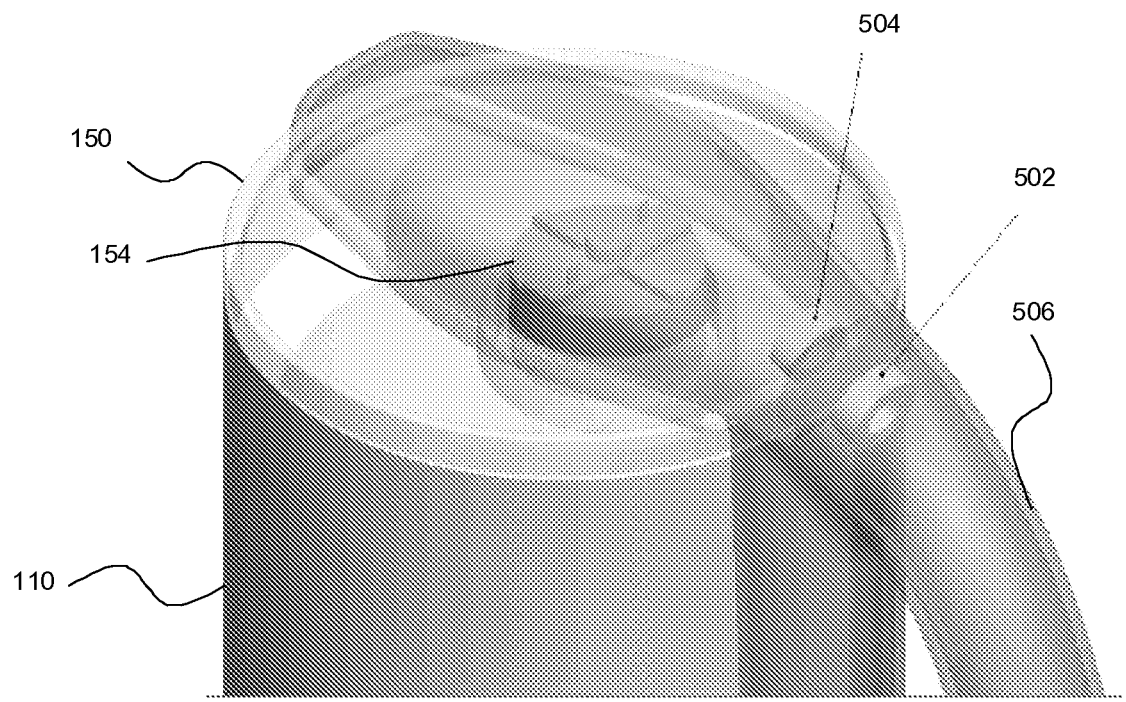
FIG. 5 shows a top view of yet another embodiment of the milk frothing apparatus according to the invention.

FIG. 5 shows another more detailed view of the top of the milk frothing apparatus 100, depicting another embodiment of the device according to the invention. In particular, FIG. 5 shows a primary winding 502 and a secondary winding 504. The windings are located closely to each other, only separated by a small layer of preferably non-conductive material. In addition, both windings should have the same orientation to maximise the inductive coupling. To further improve the inductive coupling, both windings can be provided with a ferrite core or a core of another material having a high magnetic permeability.

The orientation of both windings may be parallel to the circumference of the top of the main body 110 and substantially perpendicular to a top plane (as defined by the circumference of the opening for receiving a liquid of the main body 110) of the main body 110 As depicted by FIG. 3 and as a person skilled in the art will appreciate, the windings do not need to be exactly perpendicular to the top plane of the main body 110. The more or less perpendicular orientation of the windings facilitates removal of the lid 150 from the main body 110. This is in particular the case if the orientation of the top of the winding is tilted slightly away from the main body. The reason for this is that in this way, the lid 150 can be closed in a practical way with no obstruction. Again, it is noted that different orientation and/or locations of the windings may be considered. As an example, the orientation of the windings may be at an angle different from substantially 90° in relation to the top plane of the main body, e.g. if the handle connects to the lid 150 and/or to the appropriate part of the main body 110 at an angle different from substantially 90°.

As already disclosed above, the primary winding 502 and the secondary winding 504 can be fitted with a core, for example comprising ferrite. This can be a single, rod-shape core. In another embodiment, both windings are fitted with an M-shaped or W-shaped core, with the legs of a first core in the first winding pointing towards the legs of the legs of a second core in the second windings. In yet another example, the primary winding and the secondary winding are fit around a C-shaped core, of which the (two) legs are pointing towards each other. The cores can be oriented in various ways, without departing from the scope of the invention, as long as the legs are pointing towards each other to ensure a proper inductive coupling.

The primary winding 502 may be located in a handle 506 of the main body 110. This has as an advantage that no additional room is taken up by the primary winding 502, i.e. there are no additional parts sticking out of the main body 110. Another advantage is that a user of the milk frothing apparatus 100 has a reference for orientation as to how to align the primary winding 502 with the secondary winding 504 to ensure proper inductive coupling.

Figure 6:
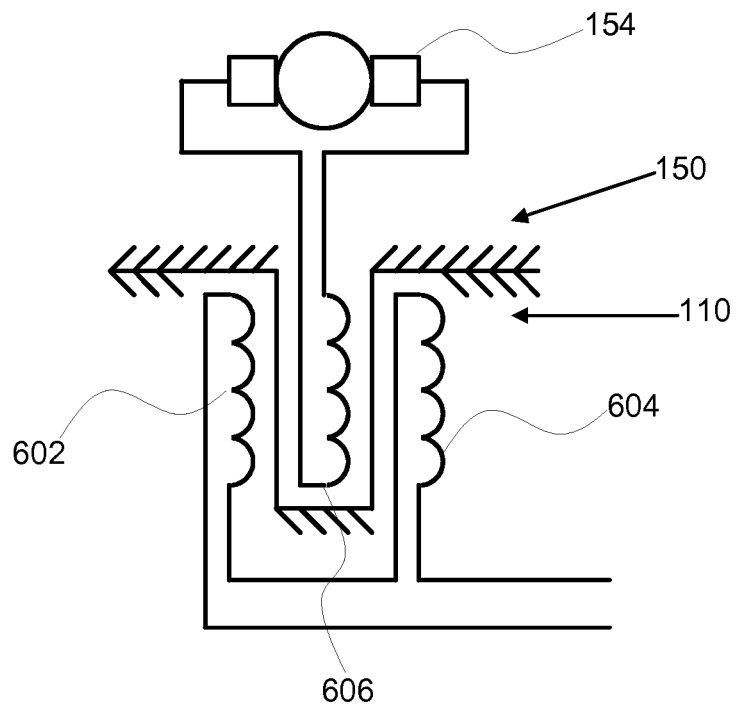
FIG. 6 provides a schematic view of an inductive coupling.

FIG. 6 shows a schematic impression of a further embodiment of the device according to the invention and in particular the location of the windings for the inductive coupling. FIG. 6 shows a first primary winding 602 and a second primary winding 604 located in the main body 110 of the milk frothing apparatus 100 and a secondary winding 606 located in the lid 150, preferably in the driving element housing 152. The second primary winding 602 and the second primary winding 604 are connected in series and coupled to a power source. The power source has been omitted for purposes of clarity; a person skilled in the art will, for example with the help of the electrical circuit 300 (FIG. 3) understand how to connect the windings to a suitable power source. The secondary winding 606 is connected to the motor 154, either directly or by other means as depicted in FIG. 3.

The windings are preferably provided as circular coils and can be embedded in the lid 150 and the main body in various orientations. The first primary winding 602 and the second primary winding 604 can be located on either side of a rectangular slit, open on either one or two adjacent sides in which a stub or a plane can be inserted, the stub or plain comprising the secondary winding 602.

The slit and stub can be oriented perpendicular to the circumference of the main body 110 and perpendicular to the top plane of the main body 110. The advantage of this set up is that the lid 150 can be put on the main body with one vertical movement.

The slit and the stub can also be oriented perpendicular to the circumference of the main body and parallel to the top plane of the main body 110. In particular, this set up can be used in a bayonet closing of the milk frothing apparatus 100, where the lid 150 is twisted to insert the stub or plane in the slit located in the main body 110. The advantage of this set up is that the container 112 is securely closed during operation of the milk frothing apparatus 100.

Figure 7:
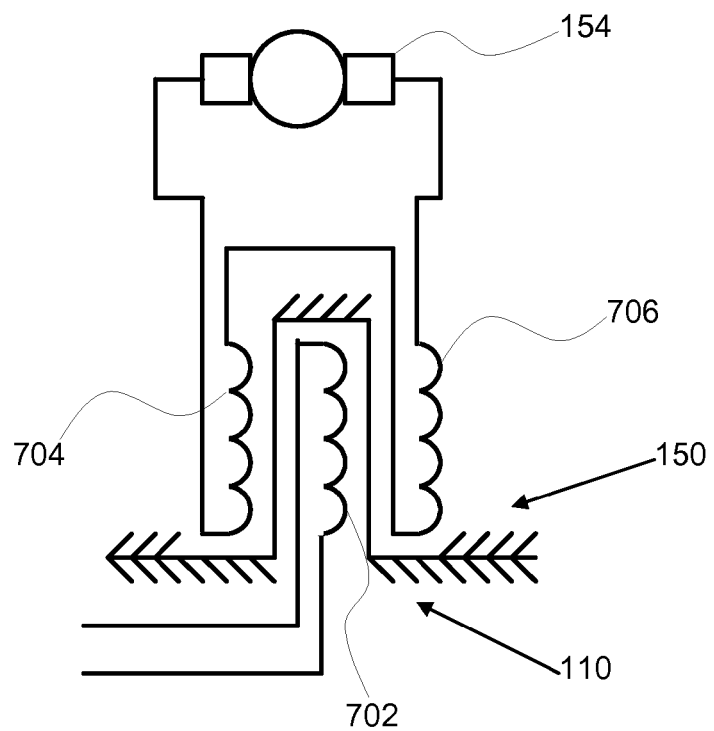
FIG. 7 provides a schematic view of another inductive coupling.

FIG. 7 shows a schematic impression of a yet another embodiment of the device according to the invention and in particular the location of the windings for the inductive coupling. FIG. 7 shows a primary winding 702 located in the main body 110 and a first secondary winding 704 and a second secondary winding 706, both located in the lid 150, preferably in the driving element housing 152. The primary winding 702 is coupled to an alternating power source, for example as depicted in FIG. 3. The first secondary winding 704 and the second primary winding 706 are connected in series and coupled to the motor 154. The primary winding 702 is located in a plate or a stub and the first secondary winding 704 and the second secondary winding 706 are located at sides of the slit. Orientation of the various elements with respect to the main body can be varied as explained by means of FIG. 6 above.

Though inductive coupling has in embodiments described above only been disclosed for transferring energy from the main body 110 to the motor 154, inductive coupling may also be used for transferring energy from the base 102 to the main body 110.

In all, it will be apparent to a person skilled in the art that the invention may be embodied in numerous ways by combining various embodiments of the invention as disclosed in the description or other measures known by a person skilled in the art, even in ways that have not been disclosed above.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention relates to a device for frothing milk with base element comprising a container for receiving milk to be frothed and a removable lid comprising a motor for driving a circular annular spring for frothing milk, the latter being driven by a motor in the lid. To this end, electrical energy needs to be transferred to the motor. This is done using inductive coupling. This removes the need for providing bare electrical contacts thus removing disadvantages like risk of short circuit and electrical shock hazards. To achieve this, both the base element and the lid are fitted with windings for transferring electrical energy. To improve the effectiveness of inductive coupling, frequency conversion means are provided to supplying an alternating current at a relatively high frequency to the first winding. The first winding is used as an inductive element for an oscillator as well.

It will be apparent to a person skilled in the art that the various embodiments of the invention as disclosed can be combined without departing from the scope of the invention.

In summary, the invention relates to a device for frothing milk or other milk based liquids (100) with a base element (102) comprising a container (112) for receiving milk to be frothed and a removable lid (150) comprising a motor (154) for driving a circular annular spring (156) for frothing milk, the latter being driven by a motor in the lid. To this end, electrical energy needs to be transferred to the motor. This is done using inductive coupling. This removes the need for providing bare electrical contacts thus removing disadvantages like risk of short circuit and electrical shock hazards. To achieve this, both the base element and the lid are fitted with windings (202, 204) for transferring electrical energy. To improve the effectiveness of inductive coupling, frequency conversion means are provided to supplying an alternating current at a relatively high frequency to the first winding. The first winding is used as an inductive element for an oscillator (324) as well.

The invention claimed is:

1. A device for frothing milk or other milk based liquids comprising:

a main body, which main body forms a container for the milk or other milk based liquids;

a cover fitting onto a top of the main body; and a driving element operatively coupled to an agitation element, the driving element being at least partially comprised by the cover;

wherein the device further comprises
an inductive coupling comprising at least one primary winding comprised by the main body and at least one secondary winding comprised by the cover, wherein power for operating the driving element is transferred from the main body to the driving element via said inductive coupling during operation of the driving element.

2. The device according to claim 1, wherein the primary winding and the secondary winding are substantially parallel to a top plane of the main body.

3. The device according to claim 1, wherein the primary winding and secondary winding are substantially parallel to a circumference of the top of the main body and substantially perpendicular to a top plane of the main body.

4. The device according to claim 1, wherein the cover and the top of the main body have a similarly shaped circumference and wherein the primary winding follows the circumference of the top of the main body and the secondary winding follows the circumference of the cover.

5. The device according to claim 1, wherein the cover comprises at least two secondary windings and the primary winding is sandwiched between the two secondary windings during operation of the driving element.

6. The device according to claim 1, wherein the main body comprises at least two primary windings and wherein the secondary winding is sandwiched between the two primary windings when operating the driving element.

7. The device according to claim 1, wherein one winding is located in a stub and the other winding is located around a hole or a slit in which the stub closely fits.

8. The device according to claim 2, wherein the cover can be locked onto the main body by means of a bayonet closing and wherein the windings are located in the bayonet closing.

9. The device according to claim 1, wherein at least one ferrite core is located in the primary winding and/or the secondary winding.

10. The device according to claim 1, wherein the main body comprises an oscillator for generating a first alternating current at a first frequency, the oscillator being coupled to the primary winding for supplying said alternating current to the primary winding.

11. The device according to claim 10, wherein the main body is connected to an external power source providing a second alternating current at a second frequency, the first frequency being higher than the second frequency.

12. The device according to claim 10, wherein the oscillator is a Collpits oscillator.

13. The device according to claim 12, wherein the primary winding is used as an inductor in the Collpits oscillator.

14. The device according to claim 13, wherein the primary winding oscillator is increased to provide higher speed for optima frothing performance.

15. Use of a device for frothing milk according to claim 1, wherein said device is used for frothing milk.

\* \* \* \* \*